United States Patent
Park

(10) Patent No.: US 11,135,908 B2
(45) Date of Patent: Oct. 5, 2021

(54) SEALING DEVICE OF SWING-IN DOOR FOR BUS

(71) Applicants: Hyundai Motor Company, Seoul (KR); Kia Motors Corporation, Seoul (KR)

(72) Inventor: Seung-Young Park, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 85 days.

(21) Appl. No.: 16/202,608

(22) Filed: Nov. 28, 2018

(65) Prior Publication Data

US 2019/0291555 A1   Sep. 26, 2019

(30) Foreign Application Priority Data

Mar. 20, 2018   (KR) ................. 10-2018-0032212

(51) Int. Cl.
*B60J 10/86*  (2016.01)
*B60J 10/15*  (2016.01)
*B60J 5/04*   (2006.01)

(52) U.S. Cl.
CPC ............ *B60J 10/86* (2016.02); *B60J 10/15* (2016.02); *B60J 5/047* (2013.01); *B60J 5/0497* (2013.01)

(58) Field of Classification Search
CPC . B60J 5/047; B60J 5/0497; B60J 10/86; B60J 10/15; E06B 7/2316
USPC ........................................ 49/306, 310, 312
See application file for complete search history.

(56) References Cited

U.S. PATENT DOCUMENTS

| | | | | |
|---|---|---|---|---|
| 1,520,584 A * | 12/1924 | Lundeen | ................... | E06B 7/20 49/310 |
| 1,709,911 A * | 4/1929 | Hyams | ................... | E06B 7/28 16/402 |
| 2,625,718 A * | 1/1953 | Ketcham | ................... | E06B 7/20 49/312 |
| 2,638,641 A * | 5/1953 | Menzies | ................... | E06B 7/20 49/312 |
| 2,679,076 A * | 5/1954 | Ketcham | ................... | E06B 7/20 49/312 |
| 4,433,505 A * | 2/1984 | Viner | ................... | B61D 19/009 49/110 |
| 4,655,144 A * | 4/1987 | Frech | ................... | B60J 5/0497 105/149.1 |
| 5,465,532 A * | 11/1995 | Varin | ................... | E06B 7/2316 49/470 |
| 6,030,024 A * | 2/2000 | Schmidhuber | ............. | B60J 5/00 296/146.12 |

(Continued)

FOREIGN PATENT DOCUMENTS

KR   20130032181 A   4/2013

OTHER PUBLICATIONS

Door System Glossary—http://shop.pwt.ca/DRT/Vendors%20Manuals/02000%20Doors%20-%20Vapor/Vapor%20Door%20System%20Glossary_603%20(Jun-06).pdf.*

*Primary Examiner* — Marcus Menezes

(74) *Attorney, Agent, or Firm* — Mintz Levin Cohn Ferris Glovsky and Popeo, P.C.; Peter F. Corless

(57) ABSTRACT

A sealing device of a swing-in door for a bus may include a lower sealing member configured to be hingedly coupled to an outdoor side of a lower end portion of the swing-in door, and a guide arm configured to be coupled to the lower end portion of the swing-in door to rotate the swing-in door in an opposite direction when rotated.

6 Claims, 8 Drawing Sheets

(56) References Cited

U.S. PATENT DOCUMENTS

| | | | | |
|---|---|---|---|---|
| 8,099,903 B2* | 1/2012 | Smink | ............... | E05D 15/1081 |
| | | | | 49/218 |
| 8,561,351 B2* | 10/2013 | Heidrich | ............... | B60J 5/0497 |
| | | | | 49/312 |
| 8,839,558 B2* | 9/2014 | Heidrich | ............... | E06B 7/21 |
| | | | | 49/306 |
| 9,951,554 B1* | 4/2018 | Beckner | ............... | E06B 7/231 |

* cited by examiner

DOOR CLOSED

DOOR OPENED

DOOR OPENED

SEALING DEVICE OF SWING-IN DOOR FOR BUS

CROSS-REFERENCE TO RELATED APPLICATION(S)

This application claims under 35 U.S.C. § 119(a) the benefit of Korean Patent Application No. 10-2018-0032212, filed on Mar. 20, 2018, the entire contents of which are incorporated herein by reference.

BACKGROUND

(a) Technical Field

The present disclosure relates to a device for sealing a gap between a floor and a swing-in door mounted in a low-floor bus.

(b) Description of Related Art

Generally, a low-floor bus refers to a bus that has a lower height from the ground to a floor of the bus as compared to a conventional bus, where the low-floor bus is configured to enable passengers to comfortably enter and exit the bus, and may be especially helpful for elderly or disabled persons.

In such a low-floor bus, a floor is formed without installing stairs, and a swing-in door which is folded toward an interior of the bus so as to be opened and closed is generally adopted so as to permit passengers to enter and exit.

Therefore, the floor of the low-floor bus is manufactured to have an inclination angle which is slightly increased toward an interior of the bus, and this configuration is intended to allow liquid such as water on the floor to be smoothly discharged.

Since a slope is formed in the floor as described above, a sealing brush member capable of coming into contact with the floor when the door is closed and being rotated upward when the door is opened toward an interior of the bus is applied to a lower portion of the door.

FIG. 1 (RELATED ART) is a view illustrating the above-mentioned conventional sealing device of a swing-in door for a bus.

In the conventional sealing device, a sealing brush member 20 is mounted on a lower portion of a door 10, and a cam cover 31 mounted on a guide arm 30 for opening and closing the door pushes the sealing brush member 20 to be rotated in an upward direction when the door 10 is opened toward an interior side of a bus.

To this end, the sealing brush member 20 includes a rotary plate 21 hingedly coupled to the door 10 and a rotary brush 22 mounted on a lower end portion of the rotary plate 21, and a stationary bracket is coupled to one side of the rotary plate 21, and a stationary plate and a stationary brush are provided on the other one side to hingedly couple the stationary plate and the rotary plate 21 to each other. In this configuration, when the door is closed by a spring provided between the stationary plate and the rotary plate, the sealing brush member is rotated downward again by a restoring force of the spring.

However, the sealing brush member 20 is mounted to an indoor side of the bus at the lower portion of the door 10, and the cam cover 31, which is mounted on an outdoor side of the bus, pushes the sealing brush member. Therefore, when the door is opened, the sealing brush member 20 is more protruded than the door 10 toward a passage through which passengers enter and exit, thereby narrowing an effective width between both doors.

In addition, when the door is closed, the cam cover is protruded toward and exposed to the outside, so that an appearance of the door is not satisfactory in terms of aesthetics.

Further, a brush of the sealing brush member 20 is likely to be deformed, and there is a problem that external air is allowed to pass through when the brush is continuously deformed.

The contents described in Description of Related Art are to help the understanding of the background of the present disclosure, and may include what is not previously known to those skilled in the art to which the present disclosure pertains.

SUMMARY

The present disclosure provides a sealing device of a swing-in door for a bus, which does not narrow an effective width between doors when the door is opened and can improve sealability performance without deteriorating an aesthetic appearance even when the door is closed.

A sealing device of a swing-in door for a bus according to one aspect of the present disclosure may include a lower sealing member configured to be hingedly coupled to an outdoor side of a lower end portion of a swing-in door; and a guide arm configured to be coupled to the lower end portion of the swing-in door to rotate the swing-in door in an opposite direction when rotated.

In addition, the guide arm may be configured to rotate the lower sealing member in an upward direction with respect a hinge shaft when the guide arm is rotated.

The lower sealing member may include a sealing plate configured to be hingedly coupled to the lower end portion of the swing-in door and a sealing rubber configured to be mounted on a lower end of the sealing plate.

Further, the lower sealing member may further include a hinge spring having one side that is supported by the swing-in door and an opposite side that is supported by the sealing plate.

Meanwhile, the sealing plate may be made of a stainless steel material.

Further, the sealing device may include a trim cover member mounted to an indoor side of a lower end portion of the swing-in door.

The trim cover member may include a stationary cover configured to be fixedly coupled to the lower end portion of the swing-in door and a rotary cover configured to be hingedly coupled to one longitudinal side of the stationary cover.

In addition, the rotary cover may be rotated in a direction in which the swing-in door is opened and closed, and may have a guide slot formed therein and configured to allow the guide arm to pass therethough.

Further, the trim cover member may further include a hinge spring having one side that is supported by the stationary cover and an opposite side that is supported by the rotary cover.

The sealing device of the swing-in door for a bus of the present disclosure has an advantage that the lower sealing member is provided on an outdoor side of the swing-in door when the swing-in door is closed and a component such as a conventional cam cover is not exposed to the outside, so that an appearance is aesthetically superior.

In addition, since when the swing-in door is opened, the lower sealing member is not protruded toward a passage space between both doors, the effective width between the doors is not reduced.

Further, by employing rubber instead of a brush, deformation can be reduced to further improve the sealing performance, and by applying the sealing plate, it is possible to minimize a gap at a corner portion or the like, as compared with a conventional configuration.

In addition, the guide arm directly rotates the lower sealing member without requiring structural components such as a conventional cam cover, so that there is the effect that cost is reduced.

DESCRIPTION OF SPECIFIC EMBODIMENTS

Figure 1:
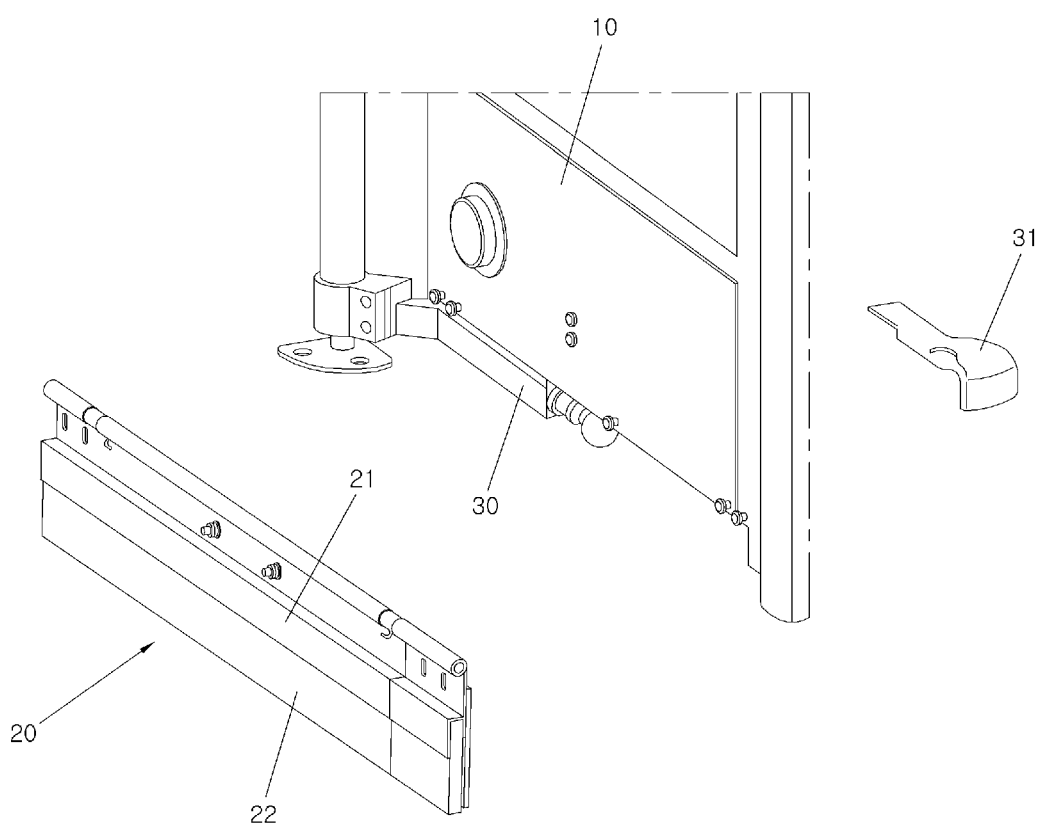
FIG. 1 (RELATED ART) is a view illustrating a conventional sealing device of a swing-in door.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In order to fully understand the present disclosure, operational advantages of the present disclosure, objects achieved by embodiments of the present disclosure, reference should be made to the accompanying drawings and contents illustrated in the accompanying drawings which illustrate the preferred embodiments of the present disclosure.

In describing the preferred embodiments of the present disclosure, well-known techniques or repetitive descriptions that may unnecessarily obscure the gist of the present disclosure will be reduced or omitted.

Figure 2:
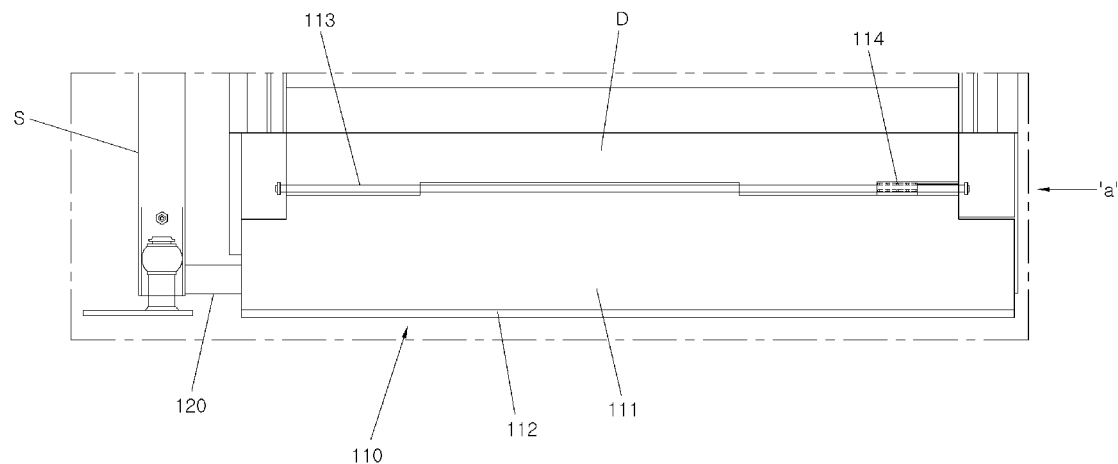
FIGS. 2 and 3 are views partially illustrating a lower sealing member constituting a sealing device of a swing-in door according to the present disclosure.
Figure 3:
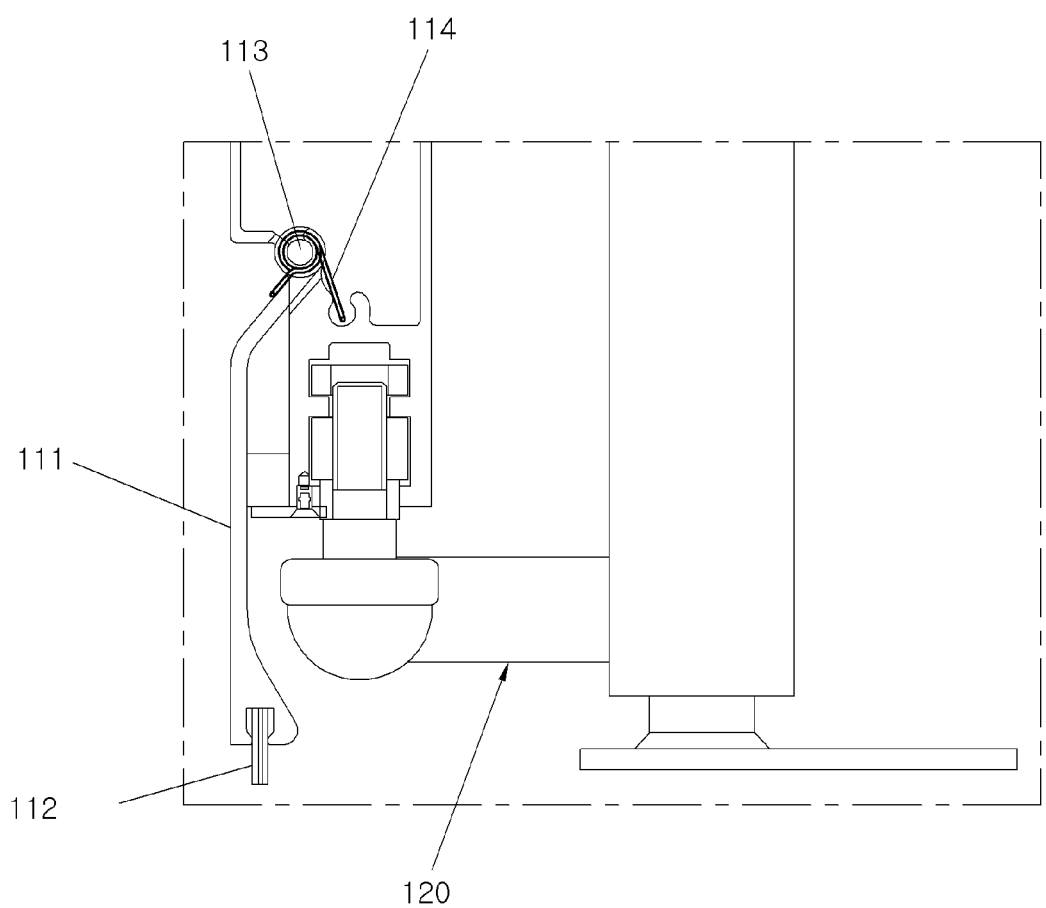
Figure 4:
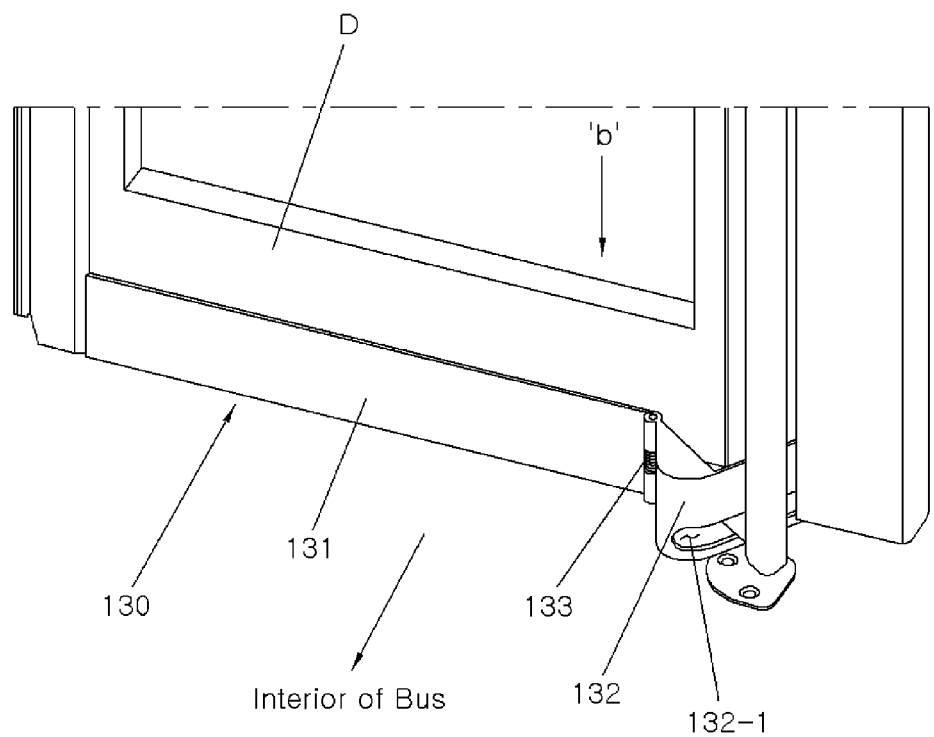
FIGS. 4 and 5 are views partially illustrating a trim cover member constituting the sealing device of a swing-in door according to the present disclosure.
Figure 5:

FIGS. 2 and 3 are views partially illustrating a lower sealing member constituting a sealing device of a swing-in door according to the present disclosure, and FIGS. 4 and 5 are views partially illustrating a trim cover member constituting the sealing device of a swing-in door according to the present disclosure.

Hereinafter, the sealing device of a swing-in door for a bus according to one embodiment of the present disclosure is described with reference to FIGS. 2 to 5.

The sealing device of a swing-in door according to one embodiment of the present disclosure is a device used for the swing-in door employed in a bus such as a low-floor bus, and this device should be configured such that due to a sloped floor, not stairs for getting on and off, a gap between a floor and the swing-in door may be sealed when the door is closed and a sealing device may be moved upward when the swing-in door is opened.

To this end, the sealing device of the swing-in door includes a lower sealing member 110 extending along and hingedly coupled to a lower end of a door D (i.e., a swing-in door) and being rotatable with respect to a hinge shaft to close a gap between a floor and the door D when the door D is closed and to be rotated in an upward direction when the door D is opened, a guide arm 120 coupled to a shaft S and rotatable by the shaft S to open and close the door D and rotate the lower sealing member 110, and a trim cover member 130 coupled to the lower end of the door D so as not to expose a lower portion of the door D.

Based on when the door D is closed, the lower sealing member 110 is coupled to a lower end portion of an outdoor side of the door D and the trim cover member 130 is coupled to a lower end portion of an indoor side of the door D.

Thus, when the door D is opened, the trim cover member 130 is exposed to a passing space between the opened doors D and the lower sealing member 110 is moved upward to the opposite side, and thus the lower sealing member is not exposed to the passing space.

The lower sealing member 110 includes a sealing plate 111 configured to be hingedly coupled to the lower end portion of the outdoor side of the door D when the door D is closed, and a sealing rubber 112 mounted on a lower end of the sealing plate 111.

The sealing plate 111 extends along and is hingedly coupled to the lower end portion of the door D by a hinge pin 113, and the sealing plate is elastically supported by a hinge spring 114 having one side that is supported by the door D and an opposite side that is supported by the sealing plate 111.

A frame of the door D to which the hinge pin 113 is coupled is configured to have a shape in which the hinge pin 113 can be inserted, and is manufactured by an extruding process using aluminum material.

Since the sealing plate 111 is exposed to an exterior side when the door is closed, a stainless steel extruding process is applied to manufacture the sealing plate having the corrosion resistance.

Holes of the lower frame of the door D and of the sealing plate 111, which are formed to allow the hinge pin 113 to be inserted, are aligned with each other, the hinge pin 113 is inserted into the holes, and a washer and a ring retainer are then assembled to each of both ends of the hinge pin to secure the lower frame and the sealing plate.

A process for assembling the ring retainer is performed so that in consideration of a future maintenance, a replacement work may be performed after removing only a part of lower portion of weather strips on both sides of the door D.

The spring should not be shaken when a bus is running, and the spring constant may be set to about 0.2 kgf·mm/deg to minimize a friction between the guide arm 120 and the spring.

FIG. 3 is a view showing a shape viewed in a direction "a" in FIG. 2. As shown in FIG. 3, a groove is formed inward on the lower end of the sealing plate 111 for mounting the sealing rubber 112, and the sealing rubber 112 is fitted into this groove.

Since the sealing plate 111 should be rotated in an upward direction with respect to the hinge pin when the door is opened by action of the guide arm 120 which will be described later, an upper portion of the sealing plate 111 has a shape which is inclined in a downward direction as shown in FIG. 3.

This configuration is provided to avoid interference between the sealing plate and the door D when the sealing plate is operated in an upward direction.

In addition, the upper portion is bent to have a perpendicular shape.

A maximum rotational angle of the sealing plate 111 is preferably 50°.

In succession, the trim cover member 130 is mounted to the lower end portion of the indoor side of the door D when the door D is closed, and may protect a passenger passing a passage between the doors D and improves an aesthetic appearance when the door D is opened.

The trim cover member 130 includes a stationary cover 131 fixedly coupled to the lower end portion of the door D and a rotary cover 132 hingedly coupled to one longitudinal side of the stationary cover 131.

A hinge spring 133 is provided on a hinge shaft to which the stationary cover 131 and the rotary cover 132 are coupled, and the hinge spring 133 has one side supported by the stationary cover 131 and the other side supported by the rotary cover 132 to elastically support the rotary cover 132.

FIG. 5 is a view showing a shape viewed in the direction "b" in FIG. 4. As shown in FIG. 5, the shaft is provided on one longitudinal side of the door D at a position which is not parallel to a longitudinal direction of the door D, and thus the guide arm 120 having one side that is coupled to the shaft and an opposite side that is coupled to the door D has a bent shape.

Therefore, the rotary cover 132 provided to prevent the guide arm 120 from being exposed is configured to have a guide slot 132-1 formed thereon as shown in FIG. 5, so that the rotary cover does not interfere with the guide arm 120 even when the guide arm 120 is operated.

In addition, since the rotary cover 132 is configured to have a rounded external shape, there is no problem in the rigidity of the rotating cover even though the rotary cover is in contact with the guide arm 120.

Figure 6:
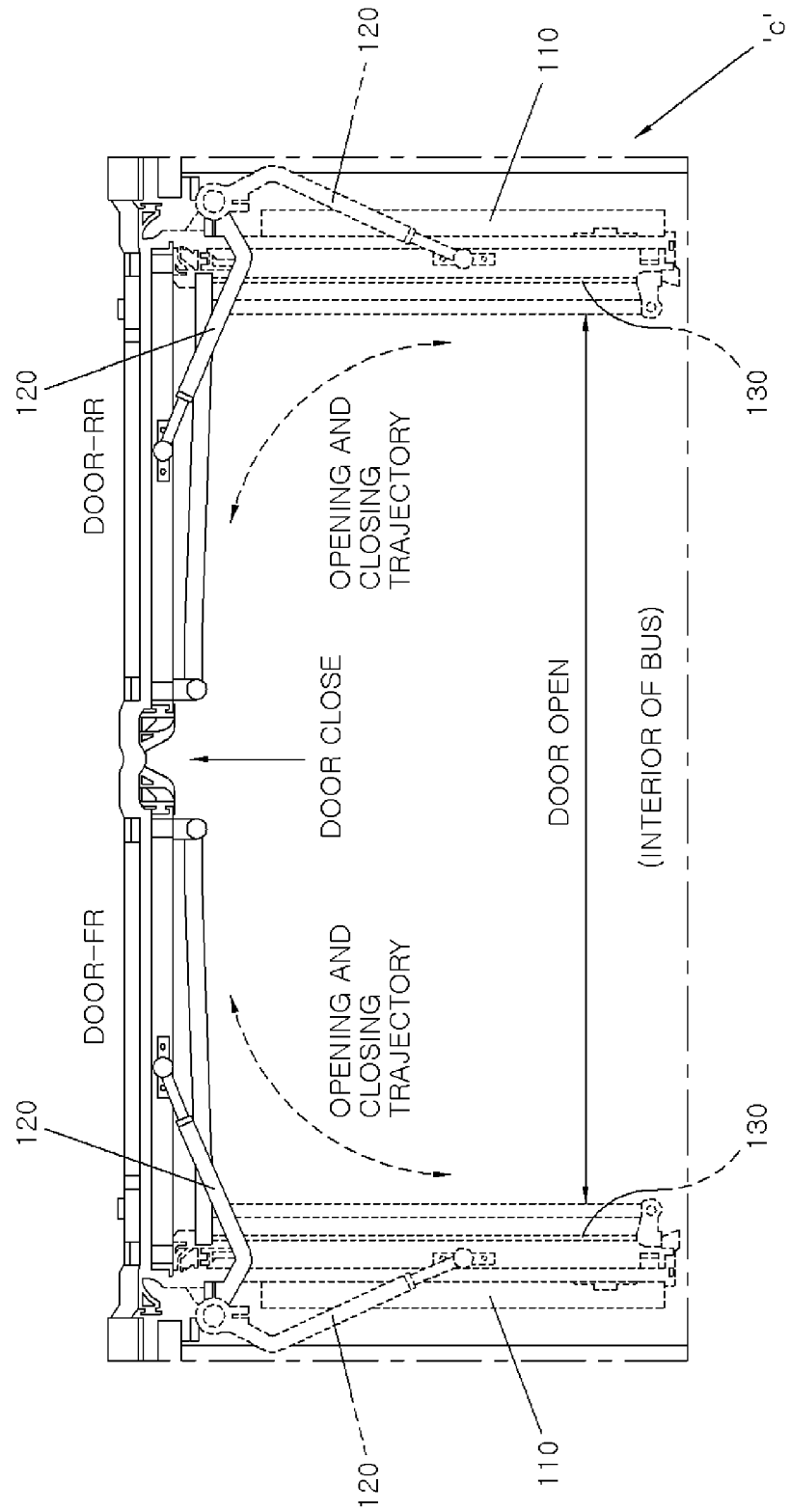
FIGS. 6 to 10 are views illustrating an operational state of the sealing device of a swing-in door according to the present disclosure.
Figure 7:
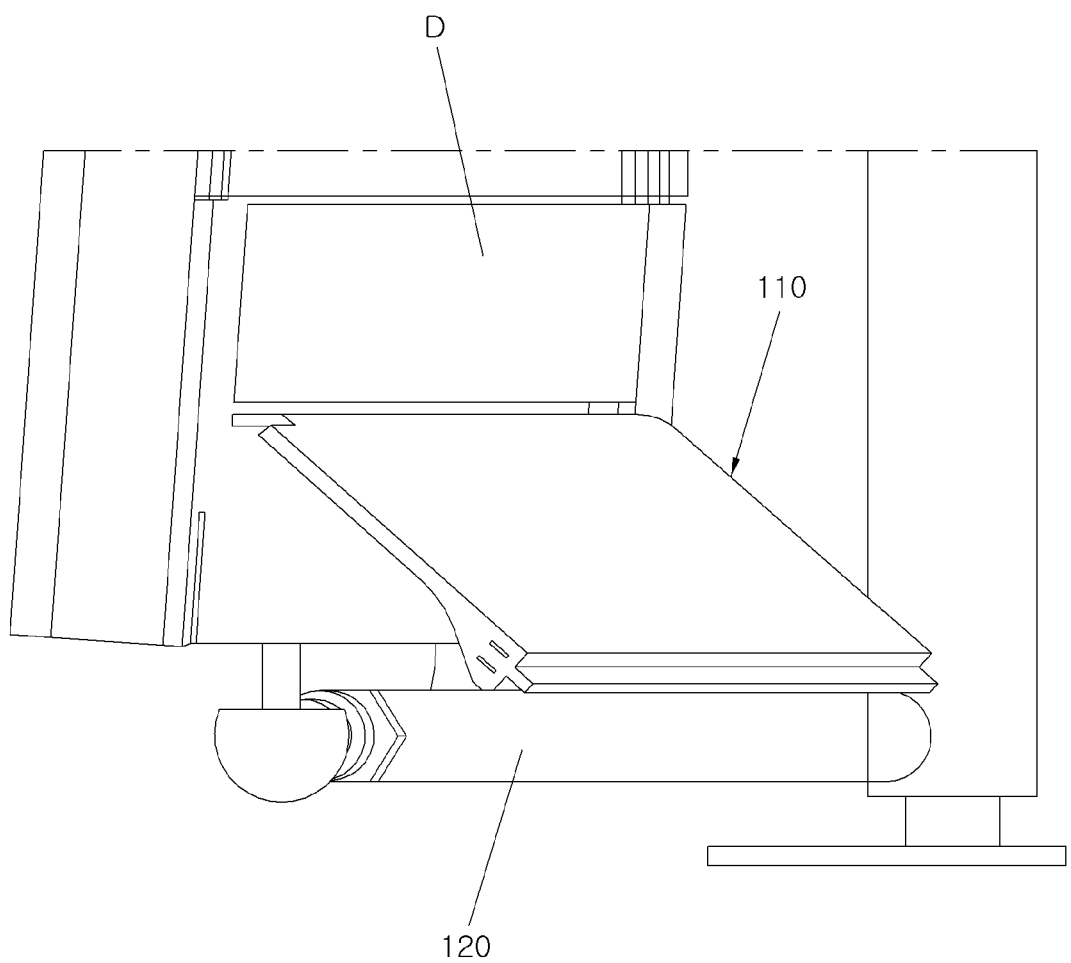

An operating state of the sealing device of the swing-in door according to the present disclosure constructed as described above is described with reference to FIGS. 6 to 10 where FIG. 6 is depicted with each door and related components in both open and closed states in solid lines for clarity, although in use, each door would be either open or closed.

The guide arm 120 is fixedly coupled to the shaft, so that as the shaft is rotated, the guide arm is rotated with respect to the shaft acting as a rotational axis, and the other side is rotatably coupled to the door.

Therefore, when the guide arm 120 is rotated toward the interior of the bus, the guide arm 120 pushes the sealing plate 111 of the lower sealing member 110 to rotate the sealing plate 111 in an upward direction.

Figure 8:
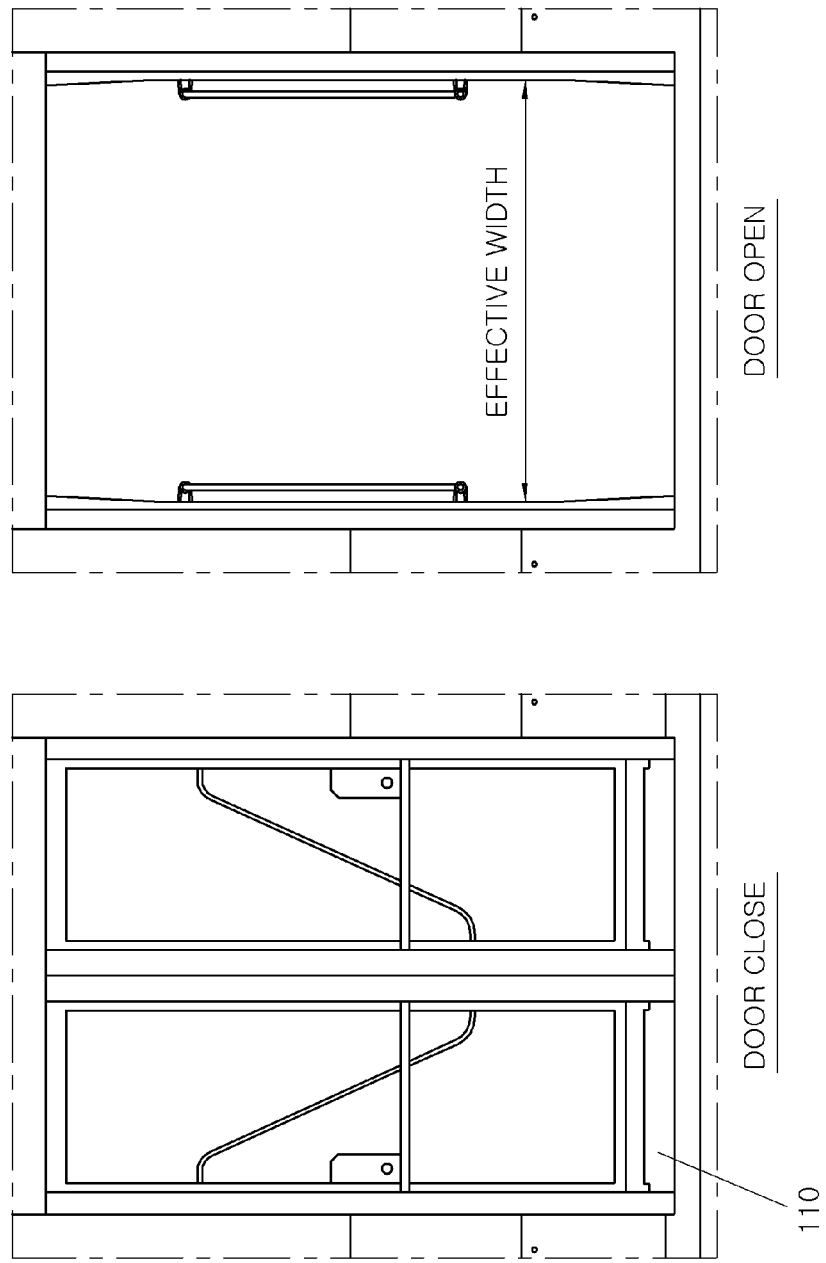

As a result, as provided herein, the lower sealing member 110 is not exposed to the passage between both opened doors (door-FR and door-RR), and does not narrow an effective width of the passage as shown in FIG. 8, as compared with the conventional configuration.

Figure 9:
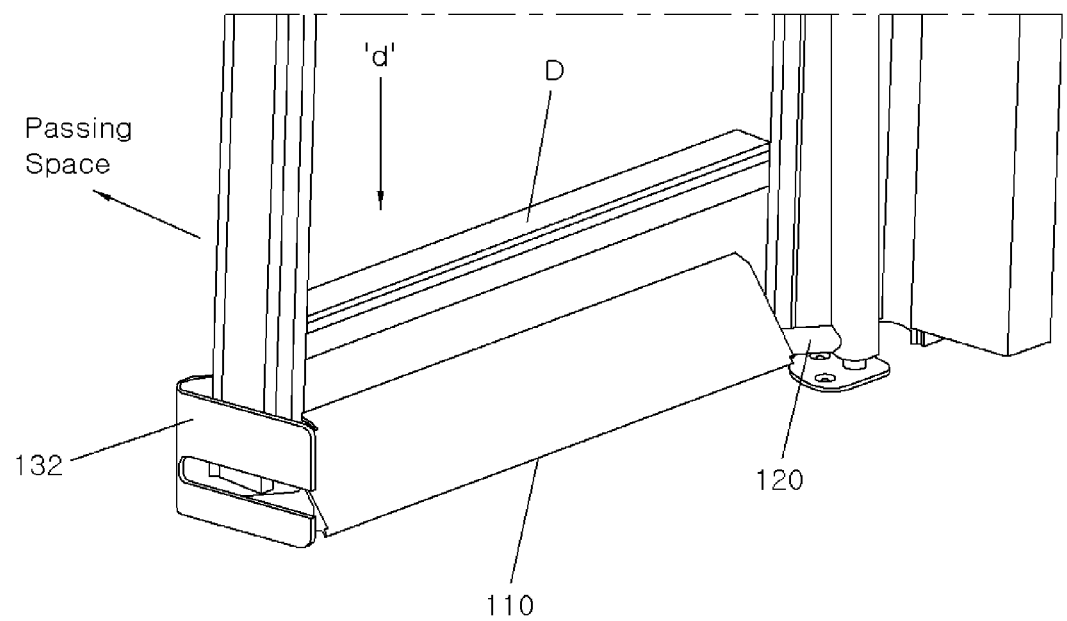
Figure 10:
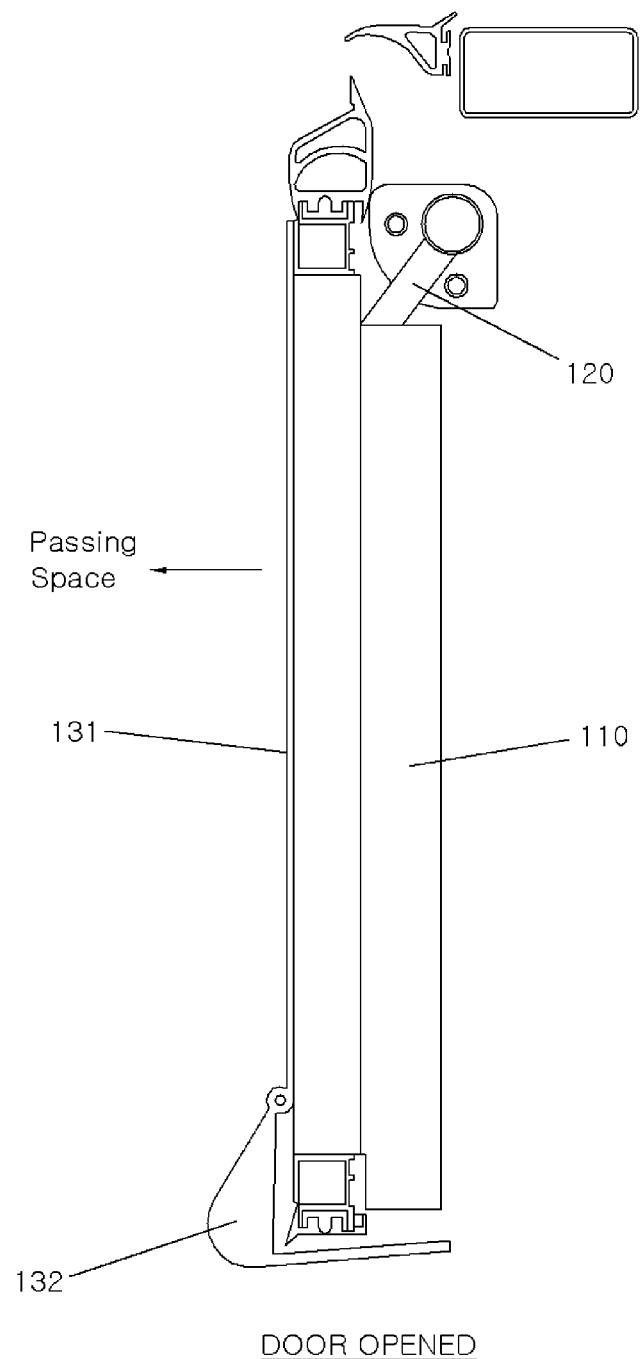

In addition, when the door D is opened from a state in which the door D is closed as shown in FIG. 4, as shown in FIG. 9 and FIG. 10 showing a configuration viewed in the direction "d" in FIG. 9, the stationary cover 131 of the trim cover member 130 is exposed to the passage between both doors to protect passengers and not to adversely affect an aesthetic appearance, and the rotary cover 132 is positioned in parallel with the stationary cover 131 due to restoration of the hinge spring 133. At this time, the rotary cover 132 is positioned in a direction opposite to the shaft.

As described above, in the sealing device of the swing-in door for a bus according to the present disclosure, since the lower sealing member provided for sealing a gap between the door and the floor is mounted on the outdoor side of the lower end portion of the door based on when door is closed, the lower sealing member is not protruded toward a space between both doors when the door is opened, and so the effective width of the passage is not reduced.

In addition, since the trim cover member is mounted on the indoor side of the lower portion of the door based on when the door is closed, the trim cover member comes into view on the basis of the indoor side of the door when the door is closed and when the door is opened, and thus it is possible to improve an aesthetic appearance.

Further, sealing is performed by the plate and the rubber, not by the brush, so that sealability is further improved and the generation of a gap can also be suppressed.

Although the above-described present disclosure has been described with reference to the illustrated drawings, it will be apparent to those skilled in the art that various changes and modifications can be made without departing from the scope of the present disclosure. Accordingly, such modifications or changes should be considered as being fallen with the claims of the present disclosure, and the scope of the present disclosure should be construed on the basis of the appended claims.

What is claimed is:

1. A sealing device of a swing-in door for a bus, comprising:
    a lower sealing member configured to be hingedly coupled to an outdoor side of a lower end portion of the swing-in door when the door is closed; and
    a guide arm coupled between a shaft and the door, wherein a first end portion of the guide arm is coupled to the shaft and a second end portion of the guide arm is coupled to the door, wherein the door is rotated on an axis of the second end portion of the guide arm when the guide arm is rotated on an axis of the shaft, wherein an indoor side of the door when the door is closed includes a trim cover member configured to be mounted on the indoor side of the lower end portion of the swing-in door so as to directly face a passing space when the door is entirely opened, the passing space being located between the door and an opposite opened door, wherein the guide arm is configured to rotate the lower sealing member in an upward direction with respect to a hinge shaft when the guide arm is rotated, and wherein the trim cover member comprises a stationary cover configured to be fixedly coupled to the lower end portion of the swing-in door, and a rotary cover configured to be hingedly coupled to one longitudinal side of the stationary cover.

2. The sealing device of claim 1, wherein the lower sealing member comprises a sealing plate configured to be hingedly coupled to the lower end portion of the swing-in door and a sealing rubber configured to be mounted on a lower end of the sealing plate.

3. The sealing device of claim 2, wherein the lower sealing member further comprises a hinge spring having one side that is supported by the swing-in door and an opposite side that is supported by the sealing plate.

4. The sealing device of claim 2, wherein the sealing plate is made of a stainless steel material.

5. The sealing device of claim 1, wherein the rotary cover is rotated in a direction in which the swing-in door is opened and closed, and has a guide slot formed therein and configured to allow the guide arm to pass therethough.

6. The sealing device of claim 5, wherein the trim cover member further comprises a hinge spring having one side that is supported by the stationary cover and an opposite side that is supported by the rotary cover.

* * * * *